United States Patent
Zhang (10) Patent No.: US 10,385,746 B2
(45) Date of Patent: Aug. 20, 2019

(54) DIESEL PARTICULATE FILTER REGENERATION SYSTEM

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 215 days.

(21) Appl. No.: 15/183,598

(22) Filed: Jun. 15, 2016

(65) Prior Publication Data

US 2017/0362977 A1    Dec. 21, 2017

(51) Int. Cl.
| | |
|---|---|
| *F01N 3/027* | (2006.01) |
| *B01D 46/00* | (2006.01) |
| *B01D 46/18* | (2006.01) |
| *B01D 46/44* | (2006.01) |
| *F01N 3/021* | (2006.01) |
| *F01N 9/00* | (2006.01) |

(52) U.S. Cl.
CPC ......... *F01N 3/027* (2013.01); *B01D 46/0063* (2013.01); *B01D 46/185* (2013.01); *B01D 46/446* (2013.01); *F01N 3/0214* (2013.01); *F01N 9/002* (2013.01); *B01D 2275/206* (2013.01); *B01D 2279/40* (2013.01); *F01N 2260/04* (2013.01); *F01N 2290/06* (2013.01); *F01N 2330/101* (2013.01); *F01N 2560/08* (2013.01); *F01N 2900/1606* (2013.01); *Y02T 10/47* (2013.01)

(58) Field of Classification Search
None
See application file for complete search history.

(56) References Cited

U.S. PATENT DOCUMENTS

| | | | | |
|---|---|---|---|---|
| 1,982,639 | A * | 12/1934 | Christofferson | B01D 46/18 210/387 |
| 2,901,626 | A * | 8/1959 | Becker | G01N 1/2258 236/15 E |
| 3,337,898 | A * | 8/1967 | Zador | B01D 46/18 15/352 |
| 3,375,638 | A * | 4/1968 | Dungler | B01D 46/18 55/290 |
| 3,596,442 | A * | 8/1971 | Neumann | B01D 46/02 55/354 |
| 3,710,548 | A * | 1/1973 | Coughlin | B01D 53/14 422/122 |

(Continued)

FOREIGN PATENT DOCUMENTS

| | | | | |
|---|---|---|---|---|
| EP | | 1591635 A1 | 11/2005 | |
| WO | WO-9300503 A2 | * | 1/1993 | ........... F01N 3/0212 |
| WO | 2013191698 A1 | | 12/2013 | |

*Primary Examiner* — Amber R Orlando
(74) *Attorney, Agent, or Firm* — Julia Voutyras; McCoy Russell LLP (57) ABSTRACT

Methods and systems are provided for regeneration of a particulate filter including a filter body having a filter paper looped along a plurality of rolling guides. At least one rolling guide may be a roller heater having a motor and a heater. Activation of the roller heater based on a pressure difference across the particulate filter regenerates the particulate filter during a regeneration phase and positions a regenerated section of the filter paper for trapping soot in a subsequent soot loading phase.

15 Claims, 6 Drawing Sheets

(56) References Cited

U.S. PATENT DOCUMENTS

| | | | | |
|---|---|---|---|---|
| 3,908,367 A * | 9/1975 | Bauman | F01N 3/0214 | 422/168 |
| 4,405,342 A * | 9/1983 | Bergman | B03C 3/155 | 55/352 |
| 4,415,342 A * | 11/1983 | Foss | B01D 46/10 | 423/245.1 |
| 4,470,833 A * | 9/1984 | Wolfe | B01D 46/46 | 335/205 |
| 4,521,230 A * | 6/1985 | Strong | B01D 46/0064 | 55/290 |
| 4,566,969 A * | 1/1986 | Klein | B01D 46/22 | 210/387 |
| 4,910,959 A * | 3/1990 | Dones | F01N 3/28 | 123/559.2 |
| 4,927,435 A * | 5/1990 | Anson | B01D 46/32 | 55/282 |
| 5,217,513 A * | 6/1993 | Armbruster | B01D 46/18 | 55/351 |
| 5,322,537 A * | 6/1994 | Nakamura | B01D 39/2086 | 55/498 |
| 5,912,423 A * | 6/1999 | Doughty | F24F 3/1603 | 55/290 |
| 6,117,672 A * | 9/2000 | Breckenridge | B01D 53/85 | 435/266 |
| 6,152,998 A * | 11/2000 | Taylor | B01D 46/18 | 55/354 |
| 6,632,269 B1 * | 10/2003 | Najm | B01D 46/0023 | 55/351 |
| 6,743,282 B2 * | 6/2004 | Najm | B01D 46/0086 | 55/351 |
| 7,186,290 B2 | 3/2007 | Sheehan et al. | | |
| 8,404,030 B2 * | 3/2013 | Schumacher | B01D 46/185 | 55/351 |
| 8,557,009 B2 | 10/2013 | Gerlach et al. | | |
| 2004/0069703 A1 * | 4/2004 | Wanni | B01D 29/09 | 210/400 |
| 2008/0087605 A1 * | 4/2008 | Maree | B01J 20/08 | 210/668 |
| 2010/0296990 A1 * | 11/2010 | England | B01D 53/02 | 423/237 |
| 2011/0067388 A1 * | 3/2011 | Zhang | B01D 46/18 | 60/311 |
| 2017/0165599 A1 * | 6/2017 | Cheng | B01D 46/44 | |
| 2018/0111078 A1 * | 4/2018 | Taylor | F24F 11/30 | |

\* cited by examiner

DIESEL PARTICULATE FILTER REGENERATION SYSTEM

FIELD

The present invention relates to diesel particulate filter regeneration.

BACKGROUND AND SUMMARY

Emission control devices, such as diesel particulate filters (DPF), may reduce the amount of soot emissions from a diesel engine by trapping soot particles. Such devices may be regenerated during operation of an engine to decrease the amount of trapped particulate matter. Regeneration is typically achieved by raising the temperature of the DPF to a predetermined level, and ensuring that the exhaust gas entering the DPF is of a certain composition.

One approach for regenerating a DPF includes injecting fuel into an exhaust stream after a main combustion event. The post-combustion injected fuel is combusted over catalysts placed along the exhaust stream. The heat released during the fuel combustion on the catalysts increases the exhaust temperature, which burns the trapped soot particles in the DPF.

However, the inventors herein have recognized potential issues with such systems. As one example, the above-described approach can result in a higher temperature increase than desired, which may be detrimental to the exhaust system components, including the DPF. The process also requires additional fuel consumption as fuel needs to be injected for the DPF regeneration to take place. Furthermore, high pressure loss may be observed due to soot deposition at both the inlet and outlet of the DPF, and in some configurations due to flow through channels within the DPF and through the porous walls comprising the channels of the DPF.

In one example, the issues described above may be addressed by a particulate filter including a filter body, a first rolling guide and a roller heater, each housed within the filter body, a particulate-trapping material extending from the first rolling guide to the roller heater, and an exhaust inlet with the particulate-trapping material extending across the exhaust inlet. The particulate filter may be coupled to an exhaust passage of an engine system with exhaust from the exhaust passage entering the particulate filter through the exhaust inlet, exhaust flowing across particulate-trapping material and exhaust flowing out of the particulate filter through an exhaust outlet. The exhaust flow through the exhaust inlet may be perpendicular to exhaust flow through the exhaust outlet.

An example method of using the particulate filter in an exhaust passage of an engine may include, during a soot loading phase, trapping soot from an exhaust stream of an engine via a filter paper loop inside a filter body of a particulate filter, the exhaust stream flowing through the filter paper and exiting through an outlet of the particulate filter, and responsive to a pressure difference across the particulate filter above a threshold, initiating regeneration of the particulate filter by activating a roller heater inside the filter body to move the filter paper loop past a heater of the roller heater.

In this way, the particulate filter may be regenerated by activating the roller heater to move the particulate-trapping material (e.g., filter paper) in proximity to the heater to burn the trapped soot from the particulate-trapping material. In doing so, injection of fuel in the exhaust stream flowing through the particulate filter is avoided, thus increasing fuel economy and lowering emissions. Further, the particulate filter only traps soot at the inlet and does not trap soot at the outlet, and the filter does not rely on channels, thus lowering the pressure drop across the filter. Additionally, the exhaust exiting the particulate filter may be relatively low temperature exhaust, as high temperatures are not utilized to regenerate the particulate filter and further because the exhaust flowing through the particulate filter may not flow past the activated roller heater while exiting the particulate filter. Further still, the above-described configuration of the particulate filter may allow ash generated during regeneration of the particulate filter to accumulate inside the filter body rather than on the particulate-trapping material, avoiding the need to remove ash from the particulate-trapping material.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
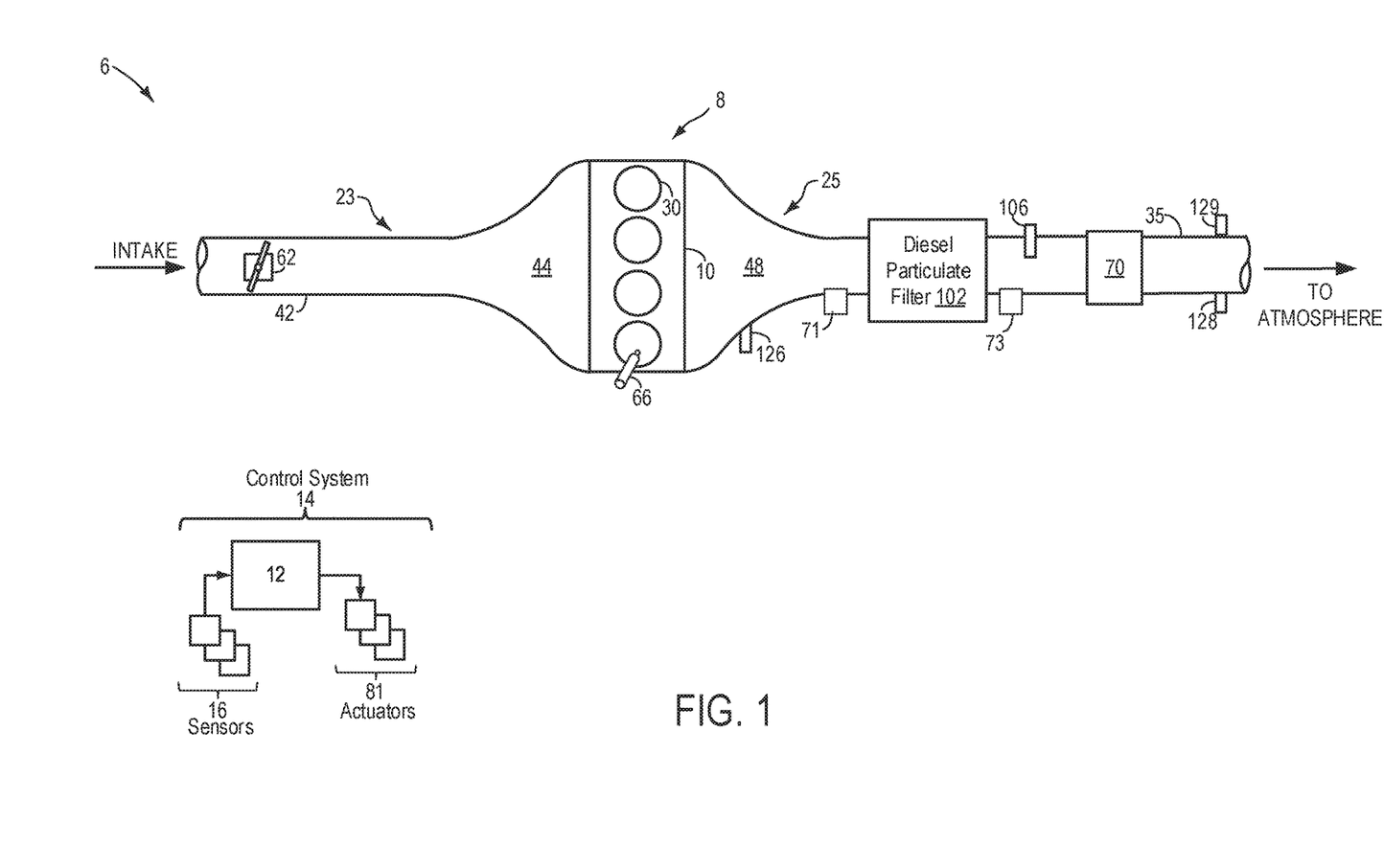
FIG. 1 illustrates an engine system including a diesel particulate filter.
Figure 2:
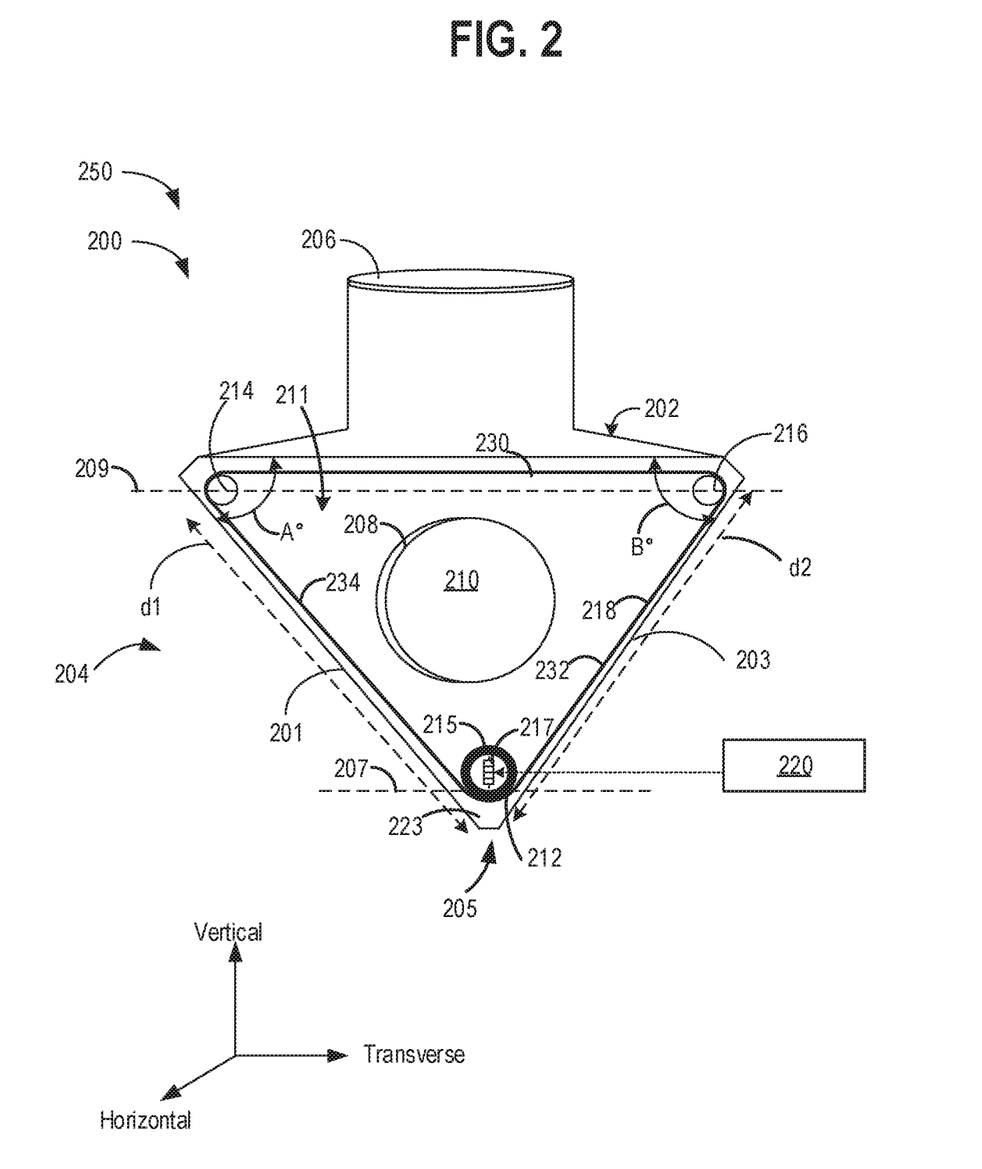
FIG. 2 shows an embodiment of a particulate filter.
Figure 3:
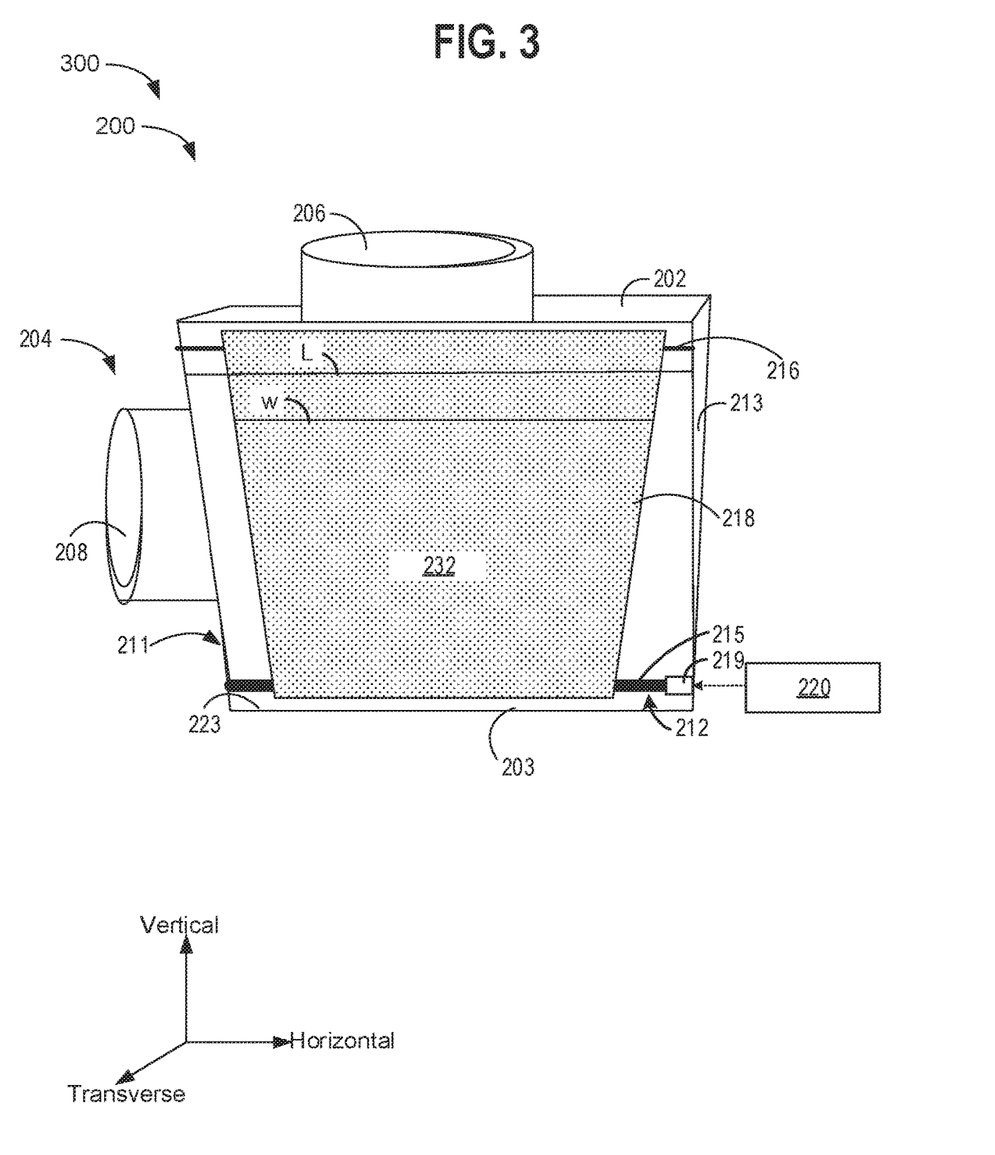
FIG. 3 shows a side view of the particulate filter of FIG. 2.
Figure 5:
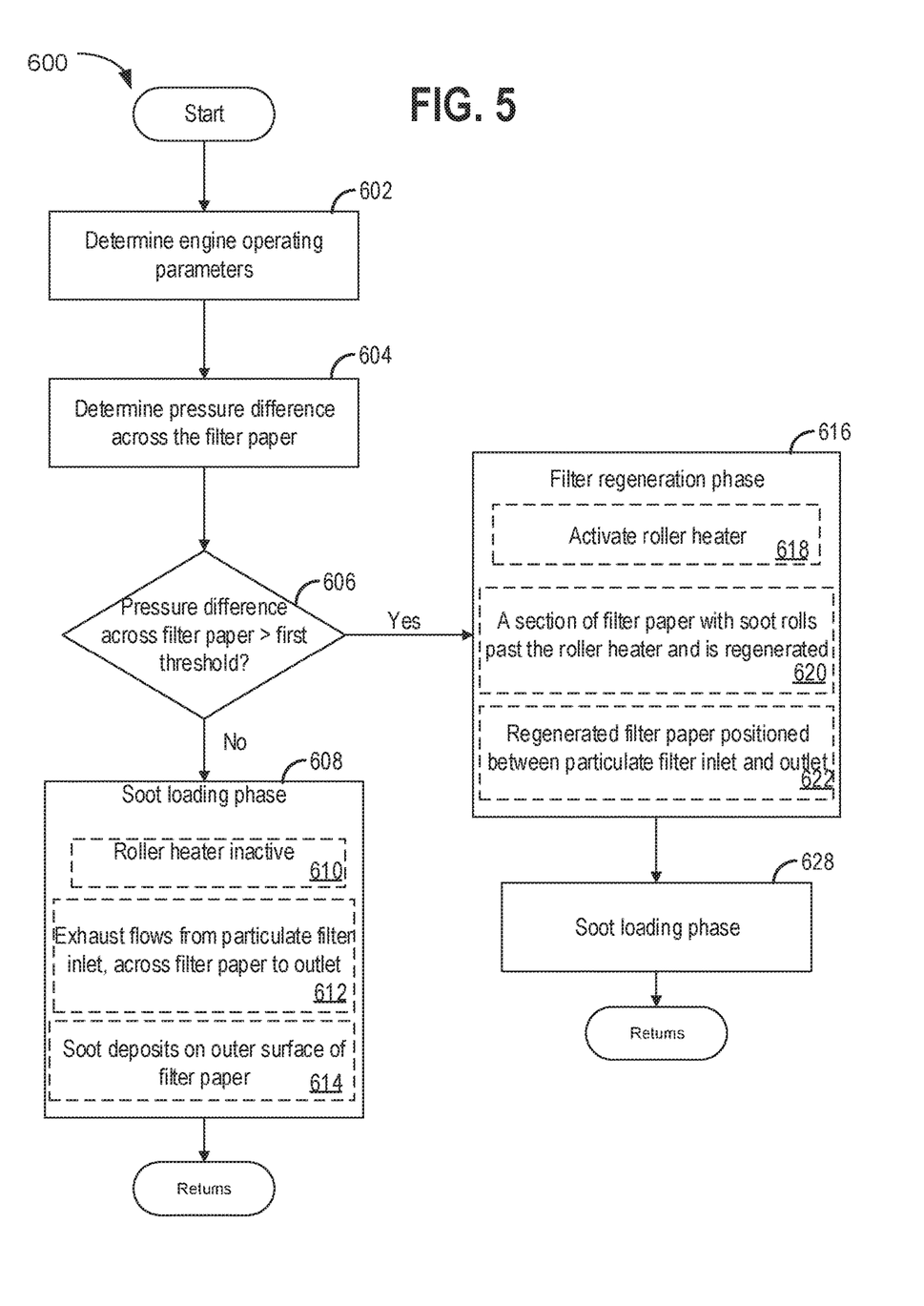
FIG. 5 shows a method for operating the particulate filter regeneration system.
Figure 6:
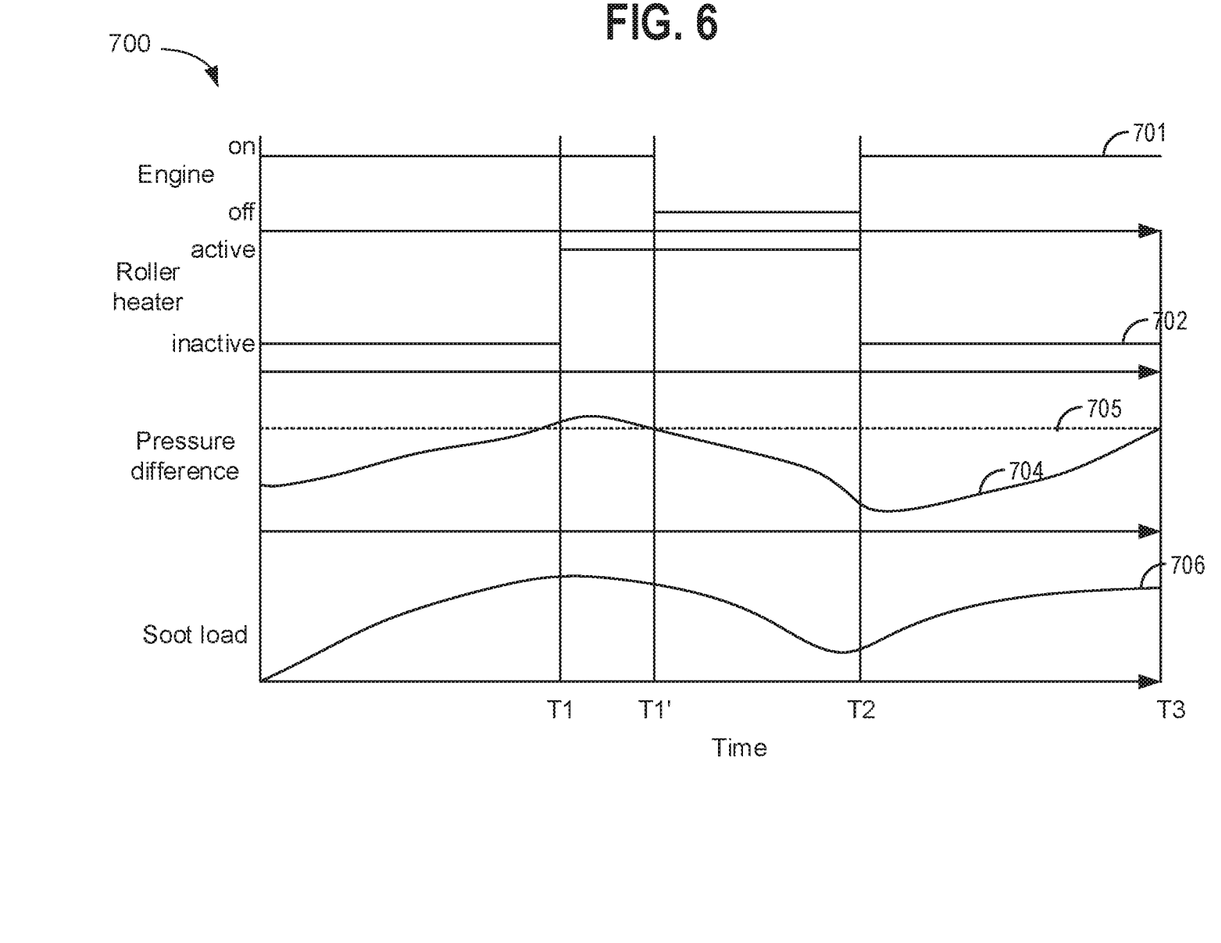
FIG. 6 illustrates an example operational map during soot loading and regeneration of the particulate filter.

The following description relates to systems and methods for operating a particulate filter positioned along an exhaust passage of an internal combustion engine, such as the engine system illustrated in FIG. 1. The particulate filter may include a filter looped around a plurality of rolling guides and a roller heater inside a filter body, as illustrated in FIGS. 2 and 3. Soot loading phase and filter regenerating phases of the particulate filter may be controlled by activation or deactivation a roller heater of the particulate filter, as illustrated in the FIGS. 4A-4C. The activation of the roller heater may be based on a pressure difference across the particulate filter. An example method of operating the particulate filter based on pressure difference across the particulate filter is illustrated in FIG. 5. FIG. 6 illustrates an operational map showing a soot loading phase and a regeneration phase of the particulate filter.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 1 shows a schematic depiction of a vehicle system 6. The vehicle system 6 includes an engine system 8. The engine system 8 may include an engine 10 having a plurality of cylinders 30. Engine 10 includes an engine intake 23 and an engine exhaust passage 25. Engine intake 23 includes a throttle 62 fluidly coupled to the engine intake manifold 44 via an intake passage 42. The engine exhaust passage 25 includes an exhaust manifold 48 eventually leading to an exhaust passage 35 that routes exhaust gas to the atmosphere. Throttle 62 may be located in intake passage 42 downstream of a boosting device, such as a turbocharger (not shown), and upstream of an after-cooler (not shown). When included, the after-cooler may be configured to reduce the temperature of intake air compressed by the boosting device.

Engine exhaust passage 25 may include one or more emission control devices 70, which may be mounted in a close-coupled position in the exhaust. One or more emission control devices may include a three-way catalyst, lean NOx filter, SCR catalyst, etc. Engine exhaust passage 25 may also include diesel particulate filter (DPF) 102, which temporarily filters particulate materials (PMs) from entering gases, positioned upstream of emission control device 70. Tailpipe exhaust gas that has been filtered of PM, following passage through DPF 102, may be measured in a PM sensor 106 and further processed in emission control device 70 and expelled to the atmosphere via exhaust passage 35. In the depicted example, PM sensor 106 is a resistive sensor that estimates the filtering efficiency of the DPF 102 based on a change in conductivity measured across the electrodes of the PM sensor.

Pressure sensors may be positioned upstream and downstream of the DPF 102, along the engine exhaust passage 25. In one example, a first pressure sensor 71 may be positioned upstream of the DPF 102 and a second pressure sensor 73 may be positioned downstream of the DPF 102, along the engine exhaust passage 25. Input from the first pressure sensor 71 and the second pressure sensor 73 may be used for regenerating the DPF, as will be described below. In one example, regeneration of the DPF based on a pressure difference across the DPF may include activation of a roller heater for burning soot deposited on a loop of filter paper present inside DPF, as will be described below with reference to FIGS. 2-6.

The vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust flow rate sensor 126 configured to measure a flow rate of exhaust gas through the exhaust passage 35, exhaust gas sensor (located in exhaust manifold 48), temperature sensor 128, pressure sensor 129 (located downstream of emission control device 70), PM sensor 106, the first pressure sensor 71 and the second pressure sensor 73. Other sensors such as additional pressure, temperature, air/fuel ratio, exhaust flow rate and composition sensors may be coupled to various locations in the vehicle system 6. As another example, the actuators may include fuel injectors 66, throttle 62, DPF roller heater that controls filter regeneration (not shown in FIG. 1), switch of electric circuit, etc.

The control system 14 may include a controller 12. The controller 12 may be configured with computer readable instructions stored on non-transitory memory. The controller 12 receives signals from the various sensors of FIG. 1, processes the signals, and employs the various actuators of FIG. 1 to adjust engine operation based on the received signals and instructions stored on a memory of the controller.

The particulate filter positioned along the engine exhaust passage 25 of FIG. 1, upstream of at least one emission control device, may include a filter body. In one example, the filter body may include a triangular cavity. In another example, the filter body may include a circular cavity, or a rectangular cavity. Inside the filter body, a plurality of rolling guides may be housed with a particulate trapping material, such as filter paper, extending across the plurality of rolling guides. In one example, at least one of the plurality of rolling guides may be a roller heater, the roller heater including a motor and a heater.

Exhaust may flow into the particulate filter through an exhaust inlet. Exhaust entering through the exhaust inlet may flow through the particulate-trapping material, and may exit the particulate filter through an exhaust outlet. In one example, the flow of exhaust into the exhaust inlet may be perpendicular to the flow of exhaust out of the exhaust inlet, reducing the backpressure along the particulate filter. Particulate material, including soot, may be trapped by the particulate trapping material when exhaust flows through the particulate trapping material, and the trapped soot may be burned off during regeneration of the particulate filter.

Regeneration of the particulate filter may be initiated by activation of the motor and the heater of the roller heater based on a pressure difference across the particulate filter. As the particulate trapping material with trapped soot rolls past the roller heater, the heater may increase the temperature to burn the soot from the particulate trapping material, thereby regenerating the particulate trapping material for subsequent soot loading. Regeneration of the particulate filter may not require additional fuel and/or oxygen in the exhaust stream for burning off the soot trapped by the particulate filter. Hence, the regeneration of the particulate filter may be initiated when the engine is on, and the regeneration may be continued even when the engine is turned off.

FIG. 2 illustrates a front view 250 of a particulate filter 200 and FIG. 3 illustrates a side view 300 of the particulate filter 200 having an exhaust inlet 206 and an exhaust outlet 208. FIGS. 2 and 3 will be described collectively. The particulate filter 200 may be the diesel particulate filter 102 positioned along the engine exhaust passage 25 of the engine system 8, illustrated in FIG. 1. Vertical, horizontal, and transverse axes for the particulate filter 200 are also depicted, where the horizontal axis may be parallel to an underbody of a vehicle having the exhaust passage with the particulate filter.

The particulate filter 200 may include a filter body 204, the filter body 204 having a top surface 202. In one example, the filter body 204 may be configured as an inverted triangular shell with the top surface 202 flanked by a first adjoining surface 201 at an angle of A degrees relative to the top surface 202 and a second adjoining surface 203 at an angle of B degrees relative to the top surface 202, as illustrated in FIG. 2. In one example, the angle A may be equal to the angle B.

The first adjoining surface 201 and the second adjoining surface 203 may converge to meet at a bottom region 205 of the filter body 204, the bottom region 205 located at a first horizontal plane 207 of the filter body. The first horizontal plane 207 may be parallel to the horizontal axis and transverse axis of particulate filter 200.

Along a front face the particulate filter 200, a first vertical surface 211 perpendicular to the top surface 202 may be present. The first vertical surface 211 may interface with the first adjoining surface 201 and with the second adjoining surface 203 as the first vertical surface 211 tapers down towards the bottom region 205 of the filter body 204, as illustrated in FIG. 2. A second vertical surface 213 may be present at a back end of the filter body (illustrated in FIG. 3), opposite the first vertical surface 21. The second vertical surface 213 may also be configured similar to the first vertical surface 211 in relation to the first adjoining surface 201 and the second adjoining surface 203.

The configuration of the top surface 202, the first adjoining surface 201, and the second adjoining surface 203, in combination with the first vertical surface 211 and the second vertical surface 213, may define a cavity 210 (illustrated in FIG. 2) inside the filter body 204. In one example, the cavity 210 may be an inverted triangular cavity. In other examples, the cavity may be of a different configuration, for example, a rectangular cavity or a circular cavity.

An exhaust outlet 208 may be positioned along the first vertical surface 211 at the front face of the filter body. In an embodiment, the exhaust inlet may be along the first adjoining wall or along the second adjoining wall and the exhaust outlet may be along the first vertical surface 211. The exhaust outlet 208 may fluidically connect the cavity 210 of the filter body to outside of the filter body. In an example, when the particulate filter 200 is positioned inside an exhaust passage, the exhaust outlet 208 may fluidically connect the cavity 210 of the particulate filter to the exhaust passage that is fluidically connected to atmosphere (e.g., the engine exhaust passage 25 of FIG. 1). The cavity 210 may be triangular such that the flow of exhaust into the exhaust inlet 206 may be perpendicular to the exhaust flow out of the exhaust outlet of the particulate filter, ensuring low backpressure across the particulate filter. Additionally, ash generated during a regeneration phase of the particulate filter may be deposited inside a base of the triangular cavity, as will be further described below.

Inside the cavity 210 of the filter body 204, a first rolling guide 214, and a second rolling guide 216 may be present along a second horizontal plane 209 of the filter body. The second horizontal plane 209 may be higher than the first horizontal plane 207 and parallel to the first horizontal plane 207 of the filter body 204. As used herein, "higher than" may include vertically higher or vertically above a reference point, such as a ground on which a vehicle in which the DPF is installed sits. As such, the second horizontal plane may be higher than the first horizontal plane with respect to the ground.

The first rolling guide 214 and the second rolling guide 216 may each include an outer surface conducive for rolling of another surface in contact with the outer surface of the rolling guides. Each of the rolling guides may be free spinning in one example. In another example, there may be a motor coupled to each of the first rolling guide and the second rolling guide. The rolling guides may be hollow or solid cylinders configured to spin around a rotational axis of each of the rolling guides, enabling a surface, for example a filter paper sheet, to roll past the rolling guides, although other configurations are possible, such as the rolling guides being triangular or square.

The first rolling guide 214 may be located at a junction of the top surface 202 and the first adjoining surface 201 and the second rolling guide 216 may be present at a junction of the top surface and the second adjoining surface 203.

The second rolling guide 216 along a length L of the top surface 202 is illustrated in FIG. 3. The first rolling guide 214 and the second rolling guide 216 may be parallel to each other and may be parallel to a central horizontal axis of the particulate filter. When installed inside an exhaust passage, the horizontal axis of the particulate filter may be parallel to a central longitudinal axis of the exhaust outlet and associated exhaust passage. The rolling guides may each run along the length L of the top surface 202. In some examples, only one rolling guide may be present. In other examples, more than two rolling guides may be present.

A roller heater 212 may be present inside the filter body 204 at the bottom region 205 of the filter body 204, along the first horizontal plane 207. In one example, the first rolling guide 214 may be present at a distance d1 and the second rolling guide may be present at a distance d2 from the roller heater 212 (illustrated in FIG. 2), where d1 may be equal to d2. In other examples, d1 and d2 may not be equal.

In one example, the first rolling guide and the second rolling guide may be along different horizontal planes, such as the second rolling guide 216 being along the first horizontal plane 207, and the first rolling guide 214 and the roller heater 212 being along the second horizontal plane 209. In another example, each of the roller heater 212, the first rolling guide 214, and the second rolling guide 216 may be along different horizontal planes of the filter body.

The roller heater 212 may include an electric heater 217 housed within a roller 215. The electric heater may include a resistive heating element or other suitable heater, which may be activated via a controller 220 (which is one non-limiting example of controller 12 of FIG. 1) to increase a temperature in proximity of the roller heater. The roller heater may include a motor 219 which when activated by the controller may rotate the roller of the roller heater around a rotational axis of the roller heater. During rotation of the roller of the roller heater, the heater may remain stationary. However, in some examples the heater may rotate along with the roller. In one example, the rotation of the roller heater may be in clockwise direction. In other examples, the rotation of the roller heater may be in anticlockwise direction. The duration of activation of the heater and the motor of the roller heater may be controlled by the controller 220 responsive to engine operating parameters. In one example routine, the motor and the heater of the roller heater may be activated for a specific duration during regeneration of the particulate filter, as will be discussed below in details with reference to FIGS. 5 and 6. In a further example, one or more of the rolling guides may also include a heater and a motor, which may be activated during regeneration of the particulate filter. In a still further example, rather than being included in a single unit, the heater and the motor of the roller heater may be separated from each other (e.g., the motor may drive a roller to move the filter paper past a heater positioned apart from the roller).

A loop of filter paper 218 may be looped between the first rolling guide 214, the second rolling guide 216, and the roller heater 212, as illustrated in FIG. 2. The loop of filter paper may trap particulate material and soot from exhaust flowing across the filter paper. The filter paper may have high absorption capacity for soot and may have suitable porosity to allow exhaust flow through the filter paper. Other particulate trapping materials, such as fabric, with high absorption capacity for soot and good penetrability for exhaust flow may be looped across the rolling guides. In other examples, organic or inorganic fibers with high adsorption capacity may be compressed to form a sheet, which may be looped across the rolling guides.

One example of the filter paper material is High Silica Fiberglass Fabric, which is made of high silica yarn and may withstand continuous working temperatures of 900° C. to 1250° C. and instantaneous temperatures of up to 1450° C. Another example is Fiberglass Fabric treated with vermiculite, which may withstand temperatures of up to 850° C.

A first section 230 of the loop of filter paper may be parallel to the top surface 202. As illustrated, a second section 232 of the loop of filter paper may be present along the second adjoining surface 203 and a third section 234 of the loop of filter paper may be along the first adjoining surface 201.

The side view 300 of the particulate filter in FIG. 3 shows the second section 232 of the loop of filter paper 218 looped across the roller heater 212 and the second rolling guide 216. In one example, a width W of the filter paper may be accommodated along the length L of particulate filter 200.

The particulate filter 200 may be positioned in an exhaust passage, for example the engine exhaust passage 25 of FIG. 1, such that the bottom region 205 of the filter body is closer to an underbody of a vehicle while the top surface may be farther from the underbody of the vehicle. The second vertical surface 213 of the filter body 204 may be closer to the engine and the first vertical surface may be farther from the engine, and closer to an opening of the exhaust passage to atmosphere. One or more emission control devices may be present downstream of the particulate filter in the exhaust passage, for example the emission control device 70 of FIG. 1.

The particulate filter may be regenerated when the soot trapped by the first section of the loop of filter paper reaches a load, which may restrict exhaust flow across the first section of the loop of filter paper. In one example, a pressure difference across the loop of filter paper may be used as an indicator of the soot load trapped by the filter paper, as will be discussed below with reference to FIGS. 5 and 6.

Figure 4A:
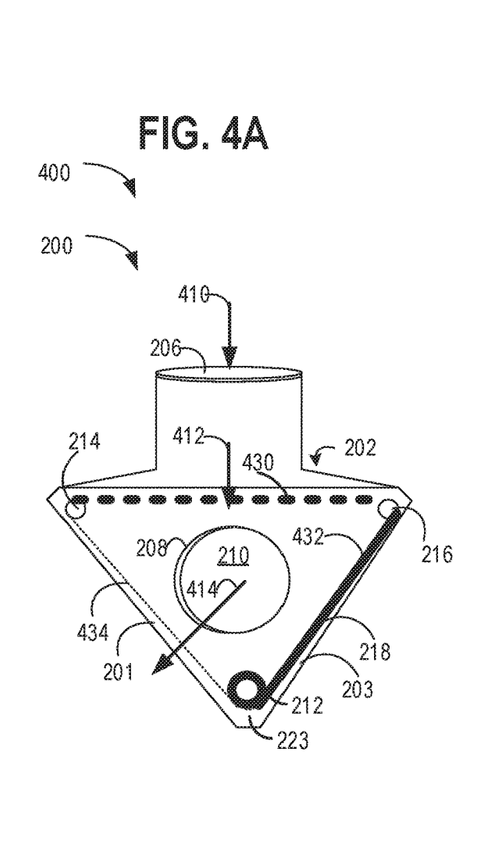
FIG. 4A shows the particulate filter of FIG. 2 in a soot loading phase.
Figure 4B:
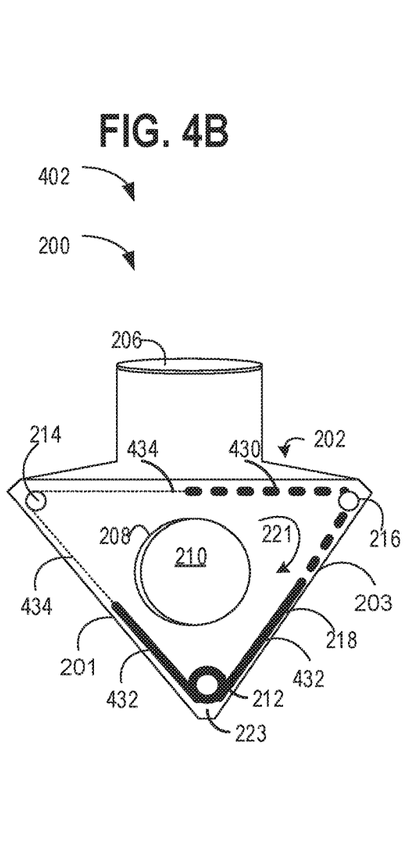
FIG. 4B shows the particulate filter of FIG. 2 in a filter regeneration phase.
Figure 4C:
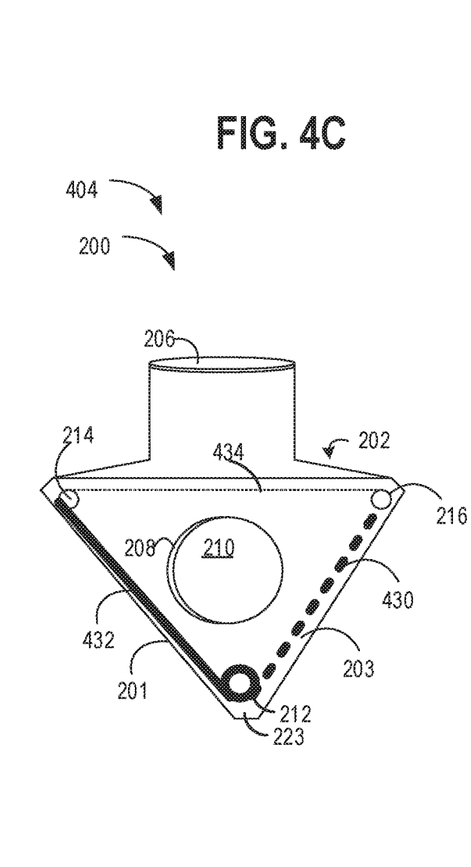
FIG. 4C shows the particulate filter of FIG. 2 at the end of the filter regeneration phase.

FIGS. 4A-4C show the particulate filter 200 of FIGS. 2 and 3 during a soot loading phase followed by a filter regeneration phase and followed by the regenerated filter being ready for the next soot loading phase, respectively. The features of the particulate filter 200 are same as described above with reference to FIGS. 2 and 3. Components previously introduced in FIGS. 2 and 3 are numbered similarly and not reintroduced.

During a soot loading phase 400, exhaust may flow in to the particulate filter 200 through the exhaust inlet 206 along a flow path 410. Exhaust may then flow through a first section 430 of the loop of filter paper 218 along a flow path 412, and may enter into the cavity 210 of the filter body. Soot from the exhaust may be trapped on an outer surface of the first section 430 of the loop of filter paper 218 as the exhaust flows along the flow path 412. Exhaust may then flow from the cavity 210 through the exhaust outlet 208 to an exhaust passage, which fluidically connects to atmosphere.

During the soot loading phase, the roller heater 212 may be inactive and the loop of filter paper may be stationary. The soot loading phase may continue until the soot load trapped on the outer surface of the first section 430 of the filter paper exceeds a maximal load capacity. During the soot loading phase 400, the second section 432 of the loop of filter paper may have soot deposited during a previous soot loading phase, while the third section 434 may be a regenerated section of the filter paper, regenerated during a previous regeneration phase.

During a regeneration phase 402 of the particulate filter 200, the motor of the roller heater may be activated, thus rotating the roller heater 212. Rotation of the roller heater 212 may move the loop of filter paper 218 along the first rolling guide 214 and second rolling guide 216 and the roller heater 212, for example, in a clockwise direction as indicated by arrow 221. As illustrated in FIG. 4B, each of the sections of the loop of filter paper is moving in a clockwise direction. As the second section 432 rolls along the roller heater, the deposited soot may be burned off due to the heat generated by the activated roller heater. Ash generated by burning of the soot may be deposited inside the cavity 210 at a bottom volume 223 directly below the roller heater 212 of the filter body 204 due to gravitational force. As the roller heater 212 is positioned above the bottom volume 223 of the triangular cavity, the ash generated by burning soot from the loop of filter paper as it rolls past the roller heater 212 may collect at the bottom volume through multiple regenerations of the particulate filter and frequent ash removal may not be required.

As the second section 432 is rolling past the roller heater, simultaneously the third section 434 (regenerated in a previous regeneration phase) of the filter moves from along the first adjoining surface 201 to along the top surface 202. Additionally, the first section 430 with the deposited soot from the soot loading phase 400 (illustrated in FIG. 4A) moves to be positioned along the second adjoining surface 203 for regeneration is a subsequent regeneration phase.

In FIG. 4C, a view 404 of the regenerated particulate filter ready for the next soot loading phase is illustrated. The second section 432 of the loop of filter paper is now positioned to trap soot from exhaust flowing in through the exhaust inlet 206 in the subsequent soot loading phase. The first section 430 with soot on its outer surface is positioned for regeneration in the next regeneration phase. The clean regenerated second section 432 is positioned along the first adjoining surface 201, and will replace third section 434 along the top surface to capture soot during the next regeneration event.

In one example, the rate of the rotation of the roller heater 212 during each regeneration phase may be such that an entirety of each section of the loop of filter paper moves from along one surface of the filter body to an adjoining surface. In other examples, more than one section or less than one section may roll from along one surface to an adjoining surface of the filter body during a regeneration phase. The heater may generate adequate heat, for example, 600° C. to 700° C. to burn off the soot in the section of the filter paper rolling along the roller heater. In one example, the first rolling guide and/or the second rolling guide may also include a heater and/or a motor.

Thus, a particulate filter may include an exhaust inlet and an exhaust outlet. A porous particulate-trapping material may extend along the exhaust inlet such that as exhaust travels from the exhaust inlet to the exhaust outlet, the exhaust travels through the porous particulate-trapping material. Particulate matter (e.g., soot) is trapped by the particulate-trapping material. The particulate filter also includes a heater (e.g., an electric heater) to selectively raise the temperature of the particulate-trapping material in order to burn off the soot and regenerate the particulate filter. To move the particulate-trapping material in proximity to the heater, the particulate-trapping material may extend across a motor-actuated roller. When the roller is activated, the particulate-trapping material moves along the heater. In one example, the roller/motor and heater may be combined in a single unit.

As described above, the particulate-trapping material may include filter paper or another suitable fiber, and the filter paper may be configured in a loop. Two roller guides may be present on either side of the exhaust inlet, and the filter paper may extend across the two roller guides. The roller/motor and heater may be present vertically below the two roller guides, such that the filter paper loop is of triangular shape. The exhaust outlet may be positioned perpendicular to the exhaust inlet. For example, the exhaust inlet may be positioned on a top of the particulate filter and the exhaust outlet may be positioned on a side of the particulate filter. A central longitudinal axis of the exhaust outlet may be positioned vertically below the two roller guides and vertically above the roller/motor and heater. In this way, soot in the exhaust may be trapped by the filter paper extending across the exhaust inlet, yet the exhaust may exit the particulate filter without flowing past the heater. By routing exhaust flow such that it does not flow past the heater, high-temperature exhaust gas produced during typical DPF regeneration, which may pose a risk to people or objects in proximity of the exhaust tailpipe, may be avoided. Further, this configuration may allow ash to accumulate inside the particulate filter rather than on the particulate-trapping material, avoiding the need to wash ash off the particulate-trapping material.

The above-described configuration of the particulate filter is one example configuration, but other configurations may be possible without departing from the scope of the disclosure. For example, rather than be configured as a loop of triangular shape, the filter paper may be of square or rectangular shape. For example, a third roller guide may be positioned on the same plane as the roller/motor and heater. In another example, the roller/motor and heater may be positioned on a side of the exhaust inlet and only one roller guide may be present, such that the filter paper is configured similar to a conveyer belt. In such a configuration, the exhaust may travel across two sections of filter paper before exiting out of the particulate filter.

FIG. 5 illustrates a method 600 for operating a particulate filter, for example, the particulate filter 200 coupled to the engine system illustrated in FIGS. 1-2. The particulate filter 200 may include the loop of filter paper, the roller heater, and an exhaust inlet and outlet, as described above with reference to FIGS. 2-4. In one example, the method 600 may regulate a soot loading phase and a regeneration phase of the particulate filter by regulating activation of the roller heater of the particulate filter responsive to engine operating conditions, such as a pressure difference across the particulate filter.

Instructions for carrying out method 600 and the rest of the methods included herein may be executed by a controller, for example, the controller 12, based on instructions stored on a memory of the controller and in conjunction with signals received from sensors of the engine system, including NOx sensors, UEGO sensors, pressure sensors, etc., described above with reference to FIG. 1. The controller may employ engine actuators of the engine system to adjust particulate filter operation, according to the methods described below. In one example, based on input from sensors, the controller 12 may activate the roller heater 212 of the particulate filter 200, to adjust the position of the loop of filter paper for burning soot.

The method 600 begins at 602 by assessing engine operating parameters, which may include but are not limited to, engine speed, engine torque demand, engine temperature, pressure across the particulate filter etc. The method 600 proceeds to 604, where a pressure difference across the loop of filter paper is determined. The pressure difference between upstream and downstream of the particulate filter also indicates the pressure difference across the loop of filter paper. Hence, the pressure difference across the loop of filter paper and pressure across the particulate filter are used synonymously. The pressure difference may be estimated or determined based on input from pressure sensors upstream and downstream of the particulate filter. At 606, the method 600 determines if the pressure difference across the loop of filter paper is more than a threshold.

If the pressure difference across the loop of filter paper is not more than the threshold, the method 600 proceeds to a soot loading phase at 608. The pressure difference below the threshold indicates that a first section of the loop of filter paper has additional soot loading capacity (e.g., the section of filter paper currently extending across the inlet of the particulate filter) and regeneration of the particulate filter is not indicated. During the soot loading phase, at 610, the roller heater is inactive. Exhaust flows through the inlet of the particulate filter and flows across the first section of the loop of filter paper and then flows out of the particulate filter through the outlet at 612. While exhaust flows across the loop of filter paper, soot from the exhaust is trapped on the outer surface of the first section loop of filter paper at 614. The method 600 then returns.

At 606, if the pressure difference is more than the threshold, soot deposited on the outer surface of the first section of the loop of filter paper may be close to or at a maximal soot capacity, where the flow of exhaust across the loop of filter paper may be compromised, generating a backpressure. The method 600 therefore proceeds to 616 for a filter regeneration phase.

During the filter regeneration phase, the roller heater of the particulate filter may be activated at 618. The activated roller heater moves one section (for example, the second section 232 of FIG. 2) of the loop of filter paper to move past the roller heater, for example, by clockwise movement of the loop of filter paper. In one example, the second section may include soot deposited from a previous soot-loading phase. Heat generated by the roller heater burns off the soot deposited on the loop of filter paper rolling past the roller heater at 620, while at 622 a third section of the loop of filter paper moves to be positioned for trapping soot in the subsequent regeneration cycle. In one example, the third section may be a previously regenerated section of the loop of filter paper.

In one example, the duration of the filter regeneration phase at 616 may be based on the rotation speed of the roller heater and a length of a section of the filter paper to be rolled past the roller heater for regeneration. In another example, the duration of each regeneration phase may be for a specific time, where at least one section of the loop of filter paper may be regenerated and a regenerated section of the loop of filter paper may be positioned for trapping soot for the next soot-loading phase.

In one example, after a regeneration phase, a pressure difference across the particulate filter still above the threshold may indicate that the filter paper is not being regenerated enough. Adequate regeneration of the filter paper may not happen if the filter paper has gone through multiple number of regenerations and needs to be replaced. In another example, lack of adequate regeneration of the filter paper may be indicative of a defective roller heater, for example, heater temperature not high enough or the motor not positioning the filter paper sections for regeneration. In an example, if high soot concentrations are detected by a soot sensor downstream of the particulate filter after a regeneration event, a crack or a break in the particulate filter may be possible. In another example, if the pressure drop across the particulate filter is low (below the threshold) after many regeneration cycles, the filter paper may get thinner and more porous, thereby not trapping soot efficiently.

The method 600 proceeds to the soot loading phase 628 after 616. The soot loading phase at 626 is similar to the soot loading phase at 608 described above. During the soot loading phase, exhaust flows across the filter paper while soot from the exhaust is trapped on the outer surface of the filter paper as described above with reference to FIG. 4A-4C above. The method 600 then returns.

Thus, a particulate filter may trap soot from the exhaust flowing through the particulate filter and may regenerate the filter paper by activating a roller heater inside the filter body. The activation of the roller heater may be based on a pressure difference across the particulate filter.

FIG. 6 shows an example operating sequence 700 during operation of a particulate filter positioned along an exhaust passage of an engine system. The example operating sequence 700 may be generated during operation of the engine system 10 with the particulate filter 200 positioned along the exhaust passage 35, as discussed above with reference to FIGS. 1-4. Plotted along the Y axis is a plot 701 indicating whether the engine is on or the engine is off. Activation and deactivation of a roller heater the particulate filter is shown by plot 702, soot load indicative of soot trapped by an outer surface of a section of loop of filter paper inside the particulate filter is indicated by plot 706, a pressure difference across the particulate filter is indicated by plot 704, and 705 indicates a threshold pressure. The X axis represents time, increasing from left side of the figure to the right side of the figure. Vertical markers (with dashed lines) indicate the times of interest.

Prior to T1, during a soot loading phase, the engine is on (plot 701). Exhaust flows in through the inlet of the particulate filter and through the loop of filter paper. Soot from the exhaust is trapped on an outer surface of a first section of the loop of filter paper as exhaust flows through the loop of filter paper (plot 706) and out of the outlet of the particulate filter. As the soot loading phase continues the soot load trapped by the first section of the loop of filter paper increases (plot 706). Consequently, a pressure difference across the particulate filter also increases during the soot loading phase prior to T1, as indicated by the plot 704. During the soot, loading phase the roller heater remains inactive (plot 702).

At T1, the pressure difference across the particulate filter may reach the threshold pressure (705), such that soot deposited on the first section of the loop of filter paper may restrict exhaust flow across the loop of filter paper and further trapping of soot by the filter paper may be compromised. Additionally, the backpressure due to the blocking of exhaust flow through the first section of the loop of filter paper may also increase.

At T1, a filter regeneration phase is initiated. The filter regeneration phase is for the duration T1-T2. During the regeneration phase, at T1, the engine is on (plot 701) the roller heater is activated (plot 702), moving the loop of filter paper and generating heat to burn off the soot deposited on a second section of the loop of filter paper rolling past the roller heater. During the regeneration phase, one section of the particulate filter may be regenerated while another regenerated section (regenerated during a previous regeneration phase) may be positioned for trapping soot from the exhaust, as described above the reference to FIGS. 4A-4C.

As the roller heater rotates and burns the soot from the loop of filter paper, the soot load on the filter paper decreases (plot 706) and the pressure difference across the particulate filter decreases too (plot 704). During the regeneration phase from T1-T2, the engine may be on from T1-T1', and may be off from T1'-T2. Regeneration initiated at T1 (when the engine is on) may continue even when the engine is turned off at T1' as additional fuel or oxygen is not required in the exhaust for regeneration of the particulate filter, and further because the motor and the heater of the roller heater are electric and may be powered by the vehicle battery in the absence of engine operation. The roller heater may be operated as long as the vehicle battery has adequate power, for example, the battery is at least 30% charged. The regeneration phase ends at T2, when the roller heater (plot 702) may be deactivated.

A second soot loading phase may happen between T2-T3. During the second soot loading phase between T2-T3, engine is on (plot 701), the roller heater is inactive (plot 702), soot load (plot 706) may again increase as soot gets trapped from the exhaust flowing through the loop of filter paper, and as more soot is trapped the pressure difference across the particulate filter (plot 704) continues to increase.

In this way, soot from exhaust may be trapped on an outer surface of the loop of filter paper inside the particulate filter and the particulate filter may be regenerated by activating the roller heater to move the loop of filter paper with soot in proximity of the roller heater to burn off the trapped soot. The regenerated filter paper may then be positioned to trap soot during a subsequent soot loading phase.

The technical effect of regenerating the above-described particulate filter by activation of the roller heater inside the filter body based on pressure difference measured across the particulate filter is maintaining efficient particulate matter trapping, along with a low exhaust backpressure across the particulate filter positioned inside an exhaust passage of an engine system.

A particulate filter, including a filter body, a first rolling guide, and a roller heater each housed within the filter body, a particulate-trapping material extending from the first rolling guide to the roller heater, and an exhaust inlet, the particulate-trapping material extending across the exhaust inlet. A first example of the particulate filter, further comprising a second rolling guide within the filter body. A second example of the particulate filter optionally includes the first example and further includes, wherein the first rolling guide and the second rolling guide are present along a first horizontal plane of the filter body. A third example of the particulate filter optionally includes one or more of the first and second examples, and further includes wherein the roller heater is present at a lowermost region of the filter body along a second horizontal plane of the filter body, the second horizontal plane lower than the first horizontal plane. A fourth example of the particulate filter optionally includes one or more of the first through the third examples, and further includes wherein the lowermost region is at a first distance from the first rolling guide and at a second distance form the second rolling guide, the second distance being equal to the first distance. A fifth example of the particulate filter optionally includes one or more of the first through the fourth examples, and further includes wherein the particulate-trapping material is a loop of filter paper. A sixth example of the particulate filter optionally includes one or more of the first through the fifth examples, and further includes wherein the roller heater includes an electric heater and a motor. A seventh example of the particulate filter optionally includes one or more of the first through the sixth examples, and further includes wherein the roller heater is activatable via a controller for regenerating the particulate-trapping material, responsive to a pressure difference across the particulate filter being more than a threshold pressure. An eighth example of the particulate filter optionally includes one or more of the first through the seventh examples, and further includes wherein exhaust is configured to flow from the exhaust inlet through the particulate-trapping material extending along a top surface of the filter body, soot from the exhaust trapped on an outer surface of the particulate-trapping material.

An example system, including a particulate filter including a body having an inlet at a top surface of the body and an outlet on a vertical surface of the body, the vertical surface perpendicular to the top surface, a filter paper looped across a plurality of rolling guides inside the body, a first rolling guide of the plurality of rolling guides including a motor and a heater, and an exhaust pipe coupled to the particulate filter with exhaust from the exhaust pipe entering the particulate filter through the inlet, exhaust flowing across the filter paper and exhaust flowing out of the particulate filter through the outlet, exhaust flow through the inlet being perpendicular to exhaust flow through the outlet. A first example of the system, wherein a second rolling guide of the plurality of rolling guides is positioned at a first end along the top surface of the body and a third rolling guide of the plurality of rolling guides is positioned at a second end along the top surface of the body, the second end opposite the first end, and both the first end and the second end along a first horizontal plane of the body. A second example of the system optionally includes the first example and further includes, wherein the first rolling guide is positioned at a bottom region of the body along a second horizontal plane of the body, the second horizontal plane lower than the first horizontal plane of the body, with the filter paper looped from the first rolling guide to the second rolling guide, and from the second rolling guide to the third rolling and then looped back from the third rolling guide to the first rolling guide. A third example of the system optionally includes one or more of the first and second examples, and further includes wherein the motor of the first rolling guide is activatable to move the filter paper across the plurality of rolling guides. A fourth example of the system optionally includes one or more of the first through the third examples, and further includes wherein the heater of the first rolling guide is activatable to generate heat for burning soot from the filter paper rolling in contact with the roller heater. A fifth example of the system optionally includes one or more of the first through the fourth examples, and further includes wherein the body is configured to collect ash generated by the burning soot.

An example method, including during a soot loading phase, trapping soot from an exhaust stream of an engine via a filter paper loop inside a filter body of a particulate filter, the exhaust stream flowing through the filter paper and exiting through an outlet of the particulate filter, and responsive to a pressure difference across the particulate filter above a threshold, initiating regeneration of the particulate filter by activating a roller heater inside the filter body to move the filter paper loop past a heater of the roller heater. A first example of the method wherein the soot loading phase is a first soot loading phase where soot from the exhaust stream is trapped via a first section of the filter paper loop extending across an inlet of the particulate filter, and wherein initiating regeneration comprises activating the roller heater to move a second section of the filter paper loop past the heater, the second section including soot trapped during a second soot loading phase previous to the first soot loading phase. A second example of the method optionally includes the first example and further includes wherein activating the roller heater to move the second section of the filter paper loop comprises activating the roller heater to simultaneously move a third section of the filter paper loop to extend across the inlet for soot collection during a third soot loading phase, subsequent to the first soot loading phase, and to move the first section of the filter paper loop for subsequent regeneration. A third example of the method optionally includes the first through the second examples, and further includes wherein initiating regeneration of the particulate filter includes initiating regeneration of the particulate filter when the engine is operating and responsive to the engine being shut down before the regeneration has completed, continuing the regeneration when the engine is shut down. A third example of the method optionally includes the first through the second examples, and further includes deactivating the roller heater responsive to completion of the regeneration of the particulate filter.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A particulate filter, comprising:
    a filter body;
    a first rolling guide and a roller heater each housed within the filter body;
    a particulate-trapping material extending from the first rolling guide to the roller heater;
    an exhaust inlet, the particulate-trapping material extending across the exhaust inlet, where the exhaust inlet is positioned upstream of the particulate-trapping material;
    an exhaust outlet, where the exhaust outlet extends in a direction perpendicular to the exhaust inlet; and
    a cavity, where the cavity is surrounded by the filter body, and where the cavity is surrounded by the particulate-trapping material, the cavity aligned with the exhaust outlet and the cavity directly accessible from an exterior of the filter body via the exhaust outlet.

2. The particulate filter of claim 1, further comprising a second rolling guide within the filter body.

3. The particulate filter of claim 2, wherein the first rolling guide and the second rolling guide are present along a first horizontal plane of the filter body.

4. The particulate filter of claim 3, wherein the roller heater is present at a lowermost region of the filter body along a second horizontal plane of the filter body, the second horizontal plane lower than the first horizontal plane.

5. The particulate filter of claim 4, wherein the lowermost region is at a first distance from the first rolling guide and at a second distance from the second rolling guide, the second distance being equal to the first distance.

6. The particulate filter of claim 1, wherein the particulate-trapping material is a loop of filter paper.

7. The particulate filter of claim 1, wherein the roller heater includes an electric heater and a motor.

8. The particulate filter of claim 1, wherein the roller heater is activatable via a controller for regenerating the particulate-trapping material, responsive to a pressure difference across the particulate filter being more than a threshold pressure.

9. The particulate filter of claim 1, wherein exhaust is configured to flow from the exhaust inlet through the particulate-trapping material extending along a top surface of the filter body, soot from the exhaust trapped on an outer surface of the particulate-trapping material.

10. A system, comprising:
    a particulate filter including a body having an inlet at a top surface of the body and an outlet on a vertical surface of the body, the vertical surface perpendicular to the top surface, wherein the body surrounds a cavity;
    a filter paper looped across a plurality of rolling guides inside the body, a first rolling guide of the plurality of rolling guides including a motor and a heater, the filter paper extending across the inlet, where the first rolling guide is offset from an opening of the outlet, and where the outlet is positioned below the inlet and above the first rolling guide, and wherein the filter paper surrounds the outlet and the cavity, the cavity being directly accessible from an exterior of the body via the outlet;
    an exhaust pipe coupled to the particulate filter with exhaust from the exhaust pipe entering the particulate filter through the inlet, exhaust flowing across the filter paper, and exhaust flowing out of the particulate filter through the outlet, exhaust flow through the inlet being perpendicular to exhaust flow through the outlet.

11. The system of claim 10, wherein a second rolling guide of the plurality of rolling guides is positioned at a first end along the top surface of the body and a third rolling guide of the plurality of rolling guides is positioned at a second end along the top surface of the body, the second end opposite the first end, and both the first end and the second end along a first horizontal plane of the body.

12. The system of claim 11, wherein the first rolling guide is positioned at a bottom region of the body along a second horizontal plane of the body, the second horizontal plane lower than the first horizontal plane of the body, with the filter paper looped from the first rolling guide to the second rolling guide, and from the second rolling guide to the third rolling guide and then looped back from the third rolling guide to the first rolling guide.

13. The system of claim 10, wherein the motor of the first rolling guide is activatable to move the filter paper across the plurality of rolling guides.

14. The system of claim 10, wherein the heater of the first rolling guide is activatable to generate heat for burning soot from the filter paper rolling in contact with the heater of the first rolling guide.

15. The system claim 14, wherein the body is configured to collect ash generated by the burning soot.

* * * * *